(12) United States Patent
Tsuchida

(10) Patent No.: US 11,588,386 B2
(45) Date of Patent: Feb. 21, 2023

(54) MOTOR, FAN, ELECTRIC VACUUM CLEANER, AND HAND DRIER

(71) Applicant: Mitsubishi Electric Corporation, Tokyo (JP)

(72) Inventor: Kazuchika Tsuchida, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 399 days.

(21) Appl. No.: 16/651,367

(22) PCT Filed: Oct. 19, 2017

(86) PCT No.: PCT/JP2017/037811
§ 371 (c)(1),
(2) Date: Mar. 27, 2020

(87) PCT Pub. No.: WO2019/077716
PCT Pub. Date: Apr. 25, 2019

(65) Prior Publication Data
US 2020/0274434 A1    Aug. 27, 2020

(51) Int. Cl.
*H02K 7/14* (2006.01)
*H02K 37/14* (2006.01)
(Continued)

(52) U.S. Cl.
CPC .............. *H02K 37/14* (2013.01); *A47K 10/48* (2013.01); *A47L 5/24* (2013.01); *A47L 9/28* (2013.01); *H02K 7/14* (2013.01)

(58) Field of Classification Search
CPC .......... H02K 1/148; H02K 7/14; H02K 37/14; H02K 2201/03
See application file for complete search history.

(56) References Cited

U.S. PATENT DOCUMENTS 3,634,707 A  *  1/1972  Tillner ................... H02K 17/10
                                                        310/172
4,596,921 A  *  6/1986  Hersh ..................... A45D 20/10
                                                        392/385
(Continued)

FOREIGN PATENT DOCUMENTS

DE    102016109083 A1    11/2016
JP    H08-317619 A       11/1996
(Continued)

OTHER PUBLICATIONS

Extended European Search Report dated Sep. 23, 2020 in connection with counterpart European Patent Application No. 17929012.7.
(Continued)

*Primary Examiner* — Dang D Le
(74) *Attorney, Agent, or Firm* — Posz Law Group, PLC

(57) ABSTRACT

A rotor has magnetic poles and a stator has the same number of teeth. Each tooth has first and second side portions in first and second directions in a circumferential direction, and a tooth tip facing the rotor. First and second protruding portions protrude in the first and second directions from the first and second side portions on the tooth tip side. The tooth tip has a first end having a gap G1 with the rotor and a second end having a gap G2 (>G1) with the rotor. A reference line passes through a rotation axis and perpendicular to a radial straight line passing through a middle position between both side portions. From the reference line, a distance D1 a border between the first protruding portion and the first side portion is longer than a distance D2 to a border between the second protruding portion and the second side portion.

15 Claims, 11 Drawing Sheets

(51) Int. Cl.
*A47K 10/48* (2006.01)
*A47L 5/24* (2006.01)
*A47L 9/28* (2006.01)

(56) References Cited

U.S. PATENT DOCUMENTS

| | | | | |
|---|---|---|---|---|
| 5,036,237 | A * | 7/1991 | London | H02K 17/10 |
| | | | | 310/179 |
| 6,727,630 | B1 * | 4/2004 | Maslov | H02K 29/03 |
| | | | | 310/156.01 |
| 7,528,516 | B2 * | 5/2009 | Mipo | H02K 1/16 |
| | | | | 310/172 |
| 7,834,501 | B2 * | 11/2010 | Childe | F16C 35/077 |
| | | | | 310/90 |
| 8,970,086 | B2 * | 3/2015 | Jo | H02K 15/022 |
| | | | | 310/216.135 |
| 2012/0139385 | A1 | 6/2012 | Sawada | |
| 2016/0344244 | A1 | 11/2016 | Li et al. | |

FOREIGN PATENT DOCUMENTS

| | | |
|---|---|---|
| JP | H11-018327 A | 1/1999 |
| JP | 2000-092755 A | 3/2000 |
| JP | 2001-186743 A | 7/2001 |
| JP | 2006-340507 A | 12/2006 |
| JP | 2008-141805 A | 6/2008 |

OTHER PUBLICATIONS

International Search Report of the International Searching Authority dated Dec. 26, 2017 for the corresponding International application No. PCT/JP2017/037811 (and English translation).
European Office Action dated May 10, 2021, issued in European Patent Application No. 17929012.7.
Office Action dated Jul. 21, 2022, issued in corresponding CN Patent Application No. 201780095923.1 (and English machine translation).
Office Action dated Oct. 9, 2021, issued in corresponding CN Patent Application No. 201780095923.1 (and English Machine Translation).
Office Action dated Apr. 18, 2022 in connection with counterpart Chinese Patent Application No. 201780095923.1 (with machine English translation).
Office Action dated Dec. 20, 2022 in corresponding CN Patent Application No. 201780095923.1 (with machine English translation).

* cited by examiner

MOTOR, FAN, ELECTRIC VACUUM CLEANER, AND HAND DRIER

CROSS REFERENCE TO RELATED APPLICATION

This application is a U.S. national stage application of International Patent Application No. PCT/JP2017/037811 filed on Oct. 19, 2017, the disclosure of which is incorporated herein by reference.

TECHNICAL FIELD

The present invention relates to a motor and relates to a fan, an electric vacuum cleaner, and a hand drier including the motor.

BACKGROUND

In a single-phase motor of an inner rotor type, the number of teeth included in a stator is generally the same as the number of magnetic poles of a rotor. When the rotation of the motor stops, tips of the teeth are positioned to face corresponding surfaces of the magnetic poles of the rotor by a magnetic attraction force. At the start of the rotation of the motor, a magnetic field is generated by a current flowing through coils of the stator to rotate the rotor by a magnetic repulsion force.

Meanwhile, in a case where the tip of each tooth has a symmetrical shape in a circumferential direction, it is not determined whether the rotor rotates either clockwise or counterclockwise when the magnetic field of the stator is generated. For this reason, in a motor disclosed in patent reference 1, a tip extension portion protruding in one direction (for example, in a clockwise direction) in the circumferential direction is formed at the tip of the tooth.

PATENT REFERENCE

Patent Reference 1: Japanese Patent Application Publication No. H11-18327 (see FIG. 2)

However, in the conventional motor described above, most of magnetic flux from the rotor flows into the tip extension portions of the teeth, and thus the magnetic flux density at the tip extension portions increases. Consequently, magnetic saturation may occur at the tip extension portions, which may increase the iron loss and may reduce the motor efficiency.

SUMMARY

The present invention is intended to solve the above-described problem, and an object of the present invention is to provide a motor capable of reducing the iron loss by suppressing an increase in magnetic flux density in teeth.

A motor of the present invention includes a rotor rotatable about a rotation axis and having a plurality of magnetic poles in a circumferential direction about the rotation axis, and a stator disposed on an outer side of the rotor in a radial direction about the rotation axis and having a plurality of teeth in the circumferential direction. The plurality of magnetic poles are of the same number as the plurality of teeth. Each of the plurality of teeth has a first side portion which is an end edge in a first direction in the circumferential direction, a second side portion which is an end edge in a second direction opposite to the first direction, and a tooth tip facing the rotor. Each of the plurality of teeth has a first protruding portion and a second protruding portion, on the tooth tip side. The first protruding portion protrudes in the first direction from the first side portion, and the second protruding portion protrudes in the second direction from the second side portion. The tooth tip has a first end in the first direction and a second end in the second direction, and a gap G2 between the second end and the rotor is wider than a gap G1 between the first end and the rotor. When a reference line is defined as a straight line passing through the rotation axis and perpendicular to a straight line in the radial direction passing through a middle position between the first side portion and the second side portion, a distance D1 from the reference line to a border between the first protruding portion and the first side portion is longer than a distance D2 from the reference line to a border between the second protruding portion and the second side portion.

According to the present invention, the gap G2 between the second end of the tooth tip and the rotor is wider than the gap G1 between the first end of the tooth tip and the rotor. Thus, the magnetic flux from the rotor is more likely to flow into the first end side (i.e., the first protruding portion side) of the tooth, so that a rotating direction of the rotor can be fixed to one direction at the start of rotation. Further, the distance D1 from the reference line to the border between the first protruding portion and the first side portion is longer than the distance D2 from the reference line to the border between the second protruding portion and the second side portion. This enables suppression of an increase in the magnetic flux density at the first protruding portion into which the magnetic flux from the rotor is more likely to flow, thereby making it possible to reduce iron loss.

DETAILED DESCRIPTION

Hereinafter, embodiments of the present invention will be described in detail with reference to the drawings. It is noted that the present invention is not limited to these embodiments.

First Embodiment (Configuration of Motor 100)

Figure 1:
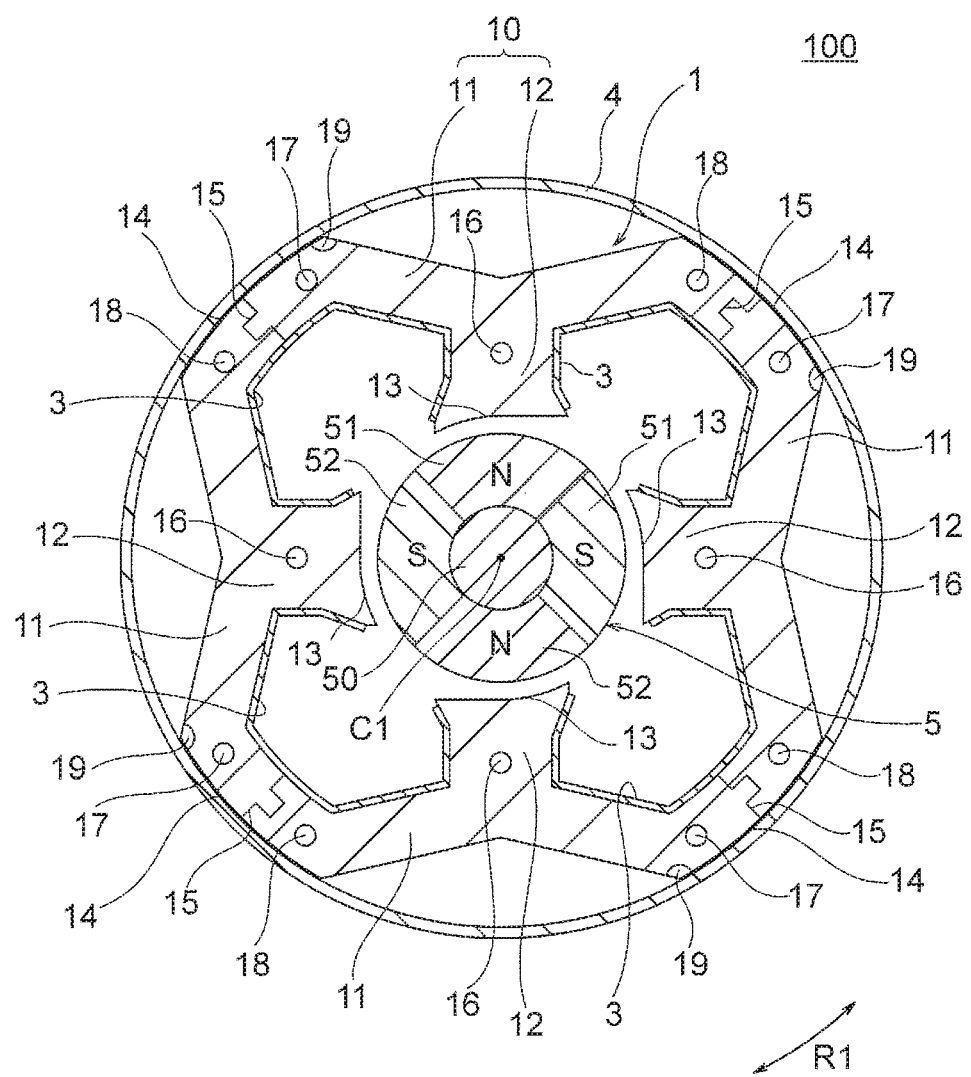
FIG. 1 is a cross-sectional view showing a motor of a first embodiment of the present invention.

FIG. 1 is a cross-sectional view showing a motor 100 according to a first embodiment of the present invention. The motor 100 is a permanent magnet synchronous motor and is a single-phase motor driven by an inverter. The motor 100 is used, for example, in a fan 110 (see FIG. 13) of an electric vacuum cleaner, a hand drier, or the like.

The motor 100 includes a rotor 5 having a shaft 50, and a stator 1 provided so as to surround the rotor 5. The stator 1 is fixed to an inner side of a cylindrical frame 4 made of metal.

In the description below, a direction of a rotation axis C1, which is a central axis of the shaft 50, is referred to as an "axial direction". A circumferential direction (indicated by an arrow R1 of FIG. 1 and the like) about the rotation axis C1 of the shaft 50 is referred to as a "circumferential direction". A radial direction about the rotation axis C1 of the shaft 50 is referred to as a "radial direction". A sectional view at a plane parallel to the axial direction is referred to as a "longitudinal-sectional view".

The rotor 5 includes the shaft 50 and permanent magnets 51 and 52 fixed around the shaft 50. The permanent magnets 51 and are arranged at equal intervals in the circumferential direction. Each of the permanent magnets 51 and 52 constitutes a magnetic pole. An outer circumferential surface of the permanent magnet 51 is, for example, an N pole, while an outer circumferential surface of the permanent magnet 52 is, for example, an S pole, but they may be reversed.

In this example, two permanent magnets 51 and two permanent magnets 52 are alternately arranged in the circumferential direction. That is, the rotor 5 has four magnetic poles. However, the number of magnetic poles of the rotor 5 is not limited to 4 and only need to be 2 or more.

The stator 1 is disposed on an outer side of the rotor 5 in the radial direction via an air gap. The stator 1 includes a stator core 10, insulating portions 3, and coils (for example, coils 35 shown in FIG. 13).

The stator core 10 is formed by stacking a plurality of stacking elements in the axial direction and integrally fixing them with crimping portions 16, 17, and 18. In this example, the stacking element is an electromagnetic steel sheet that has a thickness of, for example, 0.25 mm.

The stator core 10 has a yoke 11 surrounding the rotor 5 and a plurality of teeth 12 extending from the yoke 11 in a direction toward the rotor 5 (i.e., to an inner side in the radial direction). The teeth 12 are arranged at equal intervals in the circumferential direction. The number of teeth 12 is the same as the number of magnetic poles of the rotor 5, which is four in this example.

Slots are formed each between two teeth 12 adjacent to each other in the circumferential direction in the stator core 10. The insulating portions 3 made of an insulating resin are disposed in the respective slots. Each of the insulating portions 3 is provided so as to cover, for example, a wall surface on an inner circumferential side of the yoke 11, both end surfaces of the tooth 12 in the circumferential direction, and both end surfaces of the tooth 12 in the axial direction.

A coil is wound around the tooth 12 via the insulating portion 3. The insulating portion 3 insulates the stator core 10 from the coil. The insulating portion 3 is formed by integrally molding the resin with the stator core 10 or by assembling a resin molded body molded as a separate component to the stator core 10.

Figure 2:
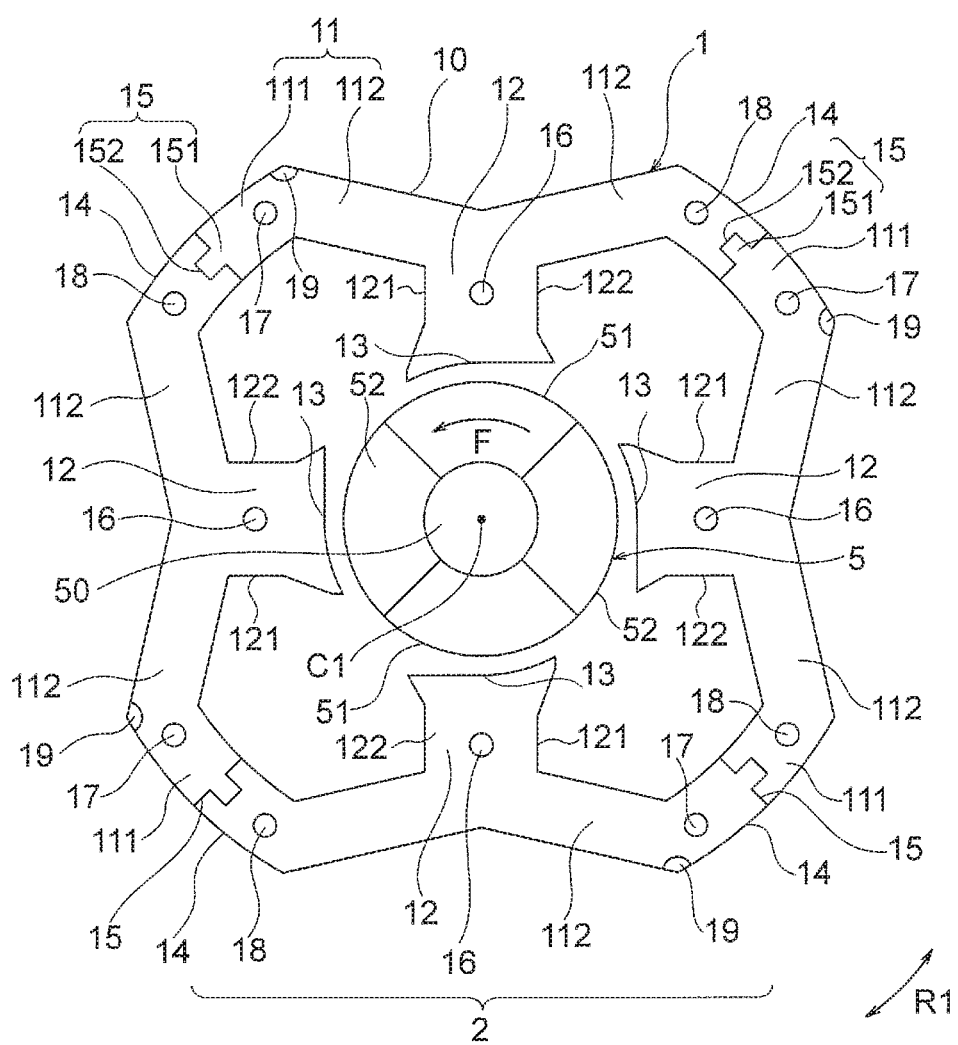
FIG. 2 is a plan view showing the motor of the first embodiment.

FIG. 2 is a plan view showing the motor 100. The insulating portions 3, the coils, and the frame 4 are omitted in FIG. 2. The yoke 11 of the stator core 10 has a plurality of arc-shaped back yokes 111. Each of the back yokes 111 is a portion of the stator 1 located on the outermost side in the radial direction.

The back yokes 111 are arranged at equal intervals in the circumferential direction. The number of back yokes 111 is the same as the number of teeth 12, which is four in this example. The above-described tooth 12 is located between two back yokes 111 adjacent to each other in the circumferential direction. An outer circumferential surface 14 of the back yoke 111 engages with a cylindrical inner circumferential surface of the frame 4 (FIG. 1).

A connecting portion 112 extends so as to connect the back yoke 111 with the tooth 12. In this example, the connecting portion 112 extends linearly so that the connecting portion 112 protrudes toward an inner side in the radial direction from the back yoke 111. Therefore, the connecting portion 112 does not contact the frame 4, while the back yoke 111 contacts the frame 4 (FIG. 1).

The tooth 12 extends toward the rotor 5 from a portion where two connecting portions 112 adjacent to each other in the circumferential direction are connected in a V shape (that is, an innermost portion of the yoke 11 in the radial direction).

A split surface 15 is formed at a center of the back yoke 111 in the circumferential direction. The stator core 10 is split into split cores 2 each for one tooth 12 at the split surfaces 15 formed in the back yokes 111. In this example, the stator core 10 is split into four split cores 2.

The split surface 15 has a convex portion 151 or a concave portion 152. Of the two split cores 2 adjacent to each other in the circumferential direction, the convex portion 151 formed at the split surface 15 of one split core 2 is fitted into the concave portion 152 formed on the split surface 15 of the other split core 2. However, the split surface 15 is not limited to such a configuration, but may be a plane (indicated by a straight line in FIG. 2).

The stator core 10 is integrally fixed with the crimping portions 16, 17, and 18. The crimping portions 16 are formed in the teeth 12, while the crimping portions 17 and 18 are formed in the yoke 11. A position of each crimping portion 16 (also referred to as a tooth crimping portion) in the circumferential direction is desirably a center of the tooth 12 in the circumferential direction. A position of the crimping portion 16 in the radial direction will be described later.

The crimping portions 17 and 18 (also referred to as yoke crimping portions) are desirably formed at positions as close as possible to the split surfaces 15 in the yoke 11, that is, in the back yokes 111. This is because a force for fixing the split cores 2 to each other acts on the split surfaces 15, and thus the stator core 10 is desirably fixed at positions close to the split surfaces 15.

Frame fixing grooves 19 that are grooves elongated in the axial direction are desirably formed on the outer circumferential side of the back yokes 111 of the yoke 11. In a state where the stator core 10 is engaged with the frame 4 (FIG. 1), parts of the frame 4 are pressed and deformed from the outer circumferential side and are fitted into the frame fixing grooves 19. This prevents the rotation of the stator 1 in the frame 4. It is also possible to employ a configuration in which no frame fixing groove 19 is provided.

Figure 3:
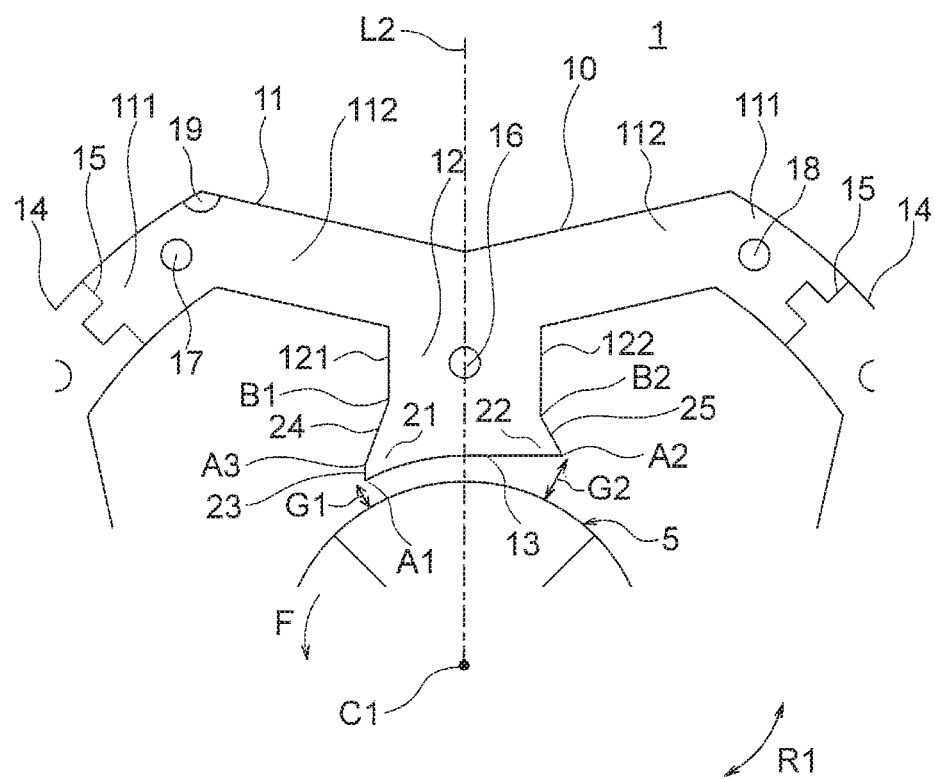
FIG. 3 is an enlarged view showing a part of a stator of the first embodiment.

Next, a shape of the tooth 12 will be described. FIG. 3 is an enlarged view showing a part of the stator 1. In FIG. 3, a counterclockwise direction in the circumferential direction about the rotation axis C1 is referred to as a "first direction", while a clockwise direction is referred to as a "second direction". A rotating direction of the rotor 5 is the first direction.

The tooth 12 has a first side portion 121 which is an end edge in the first direction (the left end in FIG. 3) and a second side portion 122 which is an end edge in the second direction (the right end in FIG. 3). Both of the first side portion 121 and the second side portion 122 extend in parallel with a straight line L2 in the radial direction passing through a center of the tooth 12 in the circumferential direction (i.e., a middle position between the first side portion 121 and the second side portion 122).

The tooth 12 also has a tooth tip 13 facing the rotor 5. A first end A1 is defined as an end of the tooth tip 13 in the first direction (the left end in FIG. 3). A second end A2 is defined as an end of the tooth tip 13 in the second direction (the right end in FIG. 3). The ends A1 and A2 are located at equal distances from the straight line L2 in this example, but may not necessarily be located at equal distances.

The tooth 12 has a first protruding portion 21 and a second protruding portion 22, on the tooth tip 13 side (i.e., on an inner side in the radial direction). The first protruding portion 21 protrudes in the first direction from the first side portion 121, while the second protruding portion 22 protrudes in the second direction from the second side portion 122.

The first protruding portion 21 has a first inclined portion 24 extending at an inclination relative to the first side portion 121, and an end edge portion 23 extending from a terminal end A3 of the first inclined portion 24 to the first end A1. The first inclined portion 24 is inclined so that a distance from the straight line L2 increases inward in the radial direction (i.e., toward the rotational axis C1). The end edge portion 23 extends in parallel with the first side portion 121 in this example, but may be inclined relative to the first side portion 121.

The second protruding portion 22 has a second inclined portion 25 extending at an inclination relative to the second side portion 122. The second inclined portion 25 is inclined so that a distance from the straight line L2 increases inward in the radial direction. The second inclined portion 25 and the tooth tip 13 are connected to each other at the second end A2.

A first border B1 is defined as a border (bent point) between the first side portion 121 and the first inclined portion 24 of the tooth 12. A second border B2 is defined as a border (bent point) between the second side portion 122 and the second inclined portion 25 of the tooth 12.

In this example, a gap G2 between the second end A2 of the tooth tip 13 and an outer circumferential surface of the rotor 5 is larger than a gap G1 between the first end A1 of the tooth tip 13 and the outer circumferential surface of the rotor 5 (i.e., G1<G2). For example, the gap G1 is 0.85 mm, while the gap G2 is 1.0 to 1.1 mm. However, the gaps G1 and G2 are not limited to these values.

The tooth tip 13 is curved in an arc shape along the outer circumferential surface of the rotor 5 on the first end A1 side with respect to its center in the circumferential direction (i.e., the position on the straight line L2). The tooth tip 13 extends linearly on the second end A2 side with respect to its center in the circumferential direction.

A large part of the magnetic flux from the permanent magnets 51 and 52 of the rotor 5 flows through a portion where the gap between the tooth 12 and the rotor 5 is narrow. As described above, since the gap between the tooth tip 13 and the outer circumferential surface of the rotor 5 is narrower on the first end A1 side and wider on the second end A2 side, a large part of the magnetic flux from the rotor 5 flows into the first end A1 side (i.e., the first protruding portion 21 side).

Figure 4:
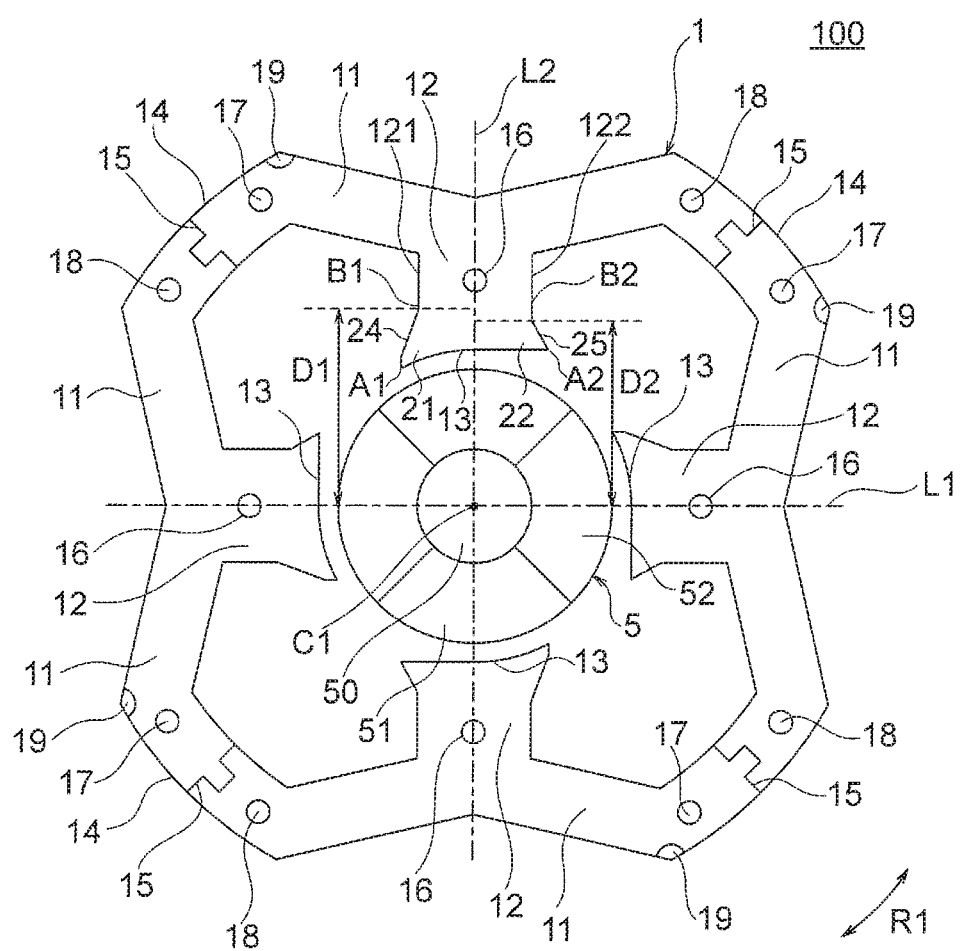
FIG. 4 is a plan view showing the motor of the first embodiment.

FIG. 4 is a plan view of the motor 100 for explaining positions of the borders B1 and B2 of the tooth 12. As shown in FIG. 4, a reference line L1 is defined as a straight line passing through the rotation axis C1 and perpendicular to the straight line L2. The straight line L2 extends in the radial direction and passes through the center of the tooth 12 in the circumferential direction (the middle position between the side portions 121 and 122).

A distance D1 from the reference line L1 to the first border B1 is longer than a distance D2 from the reference line La to the second border B2. Thus, in a plane perpendicular to the rotation axis C1, an area of the first protruding portion 21 is larger than an area of the second protruding portion 22. That is, an increase in the magnetic flux density at the first protruding portion 21 can be suppressed even when a large part of the magnetic flux from the rotor 5 flows into the first protruding portion 21 as described above.

Figure 5:
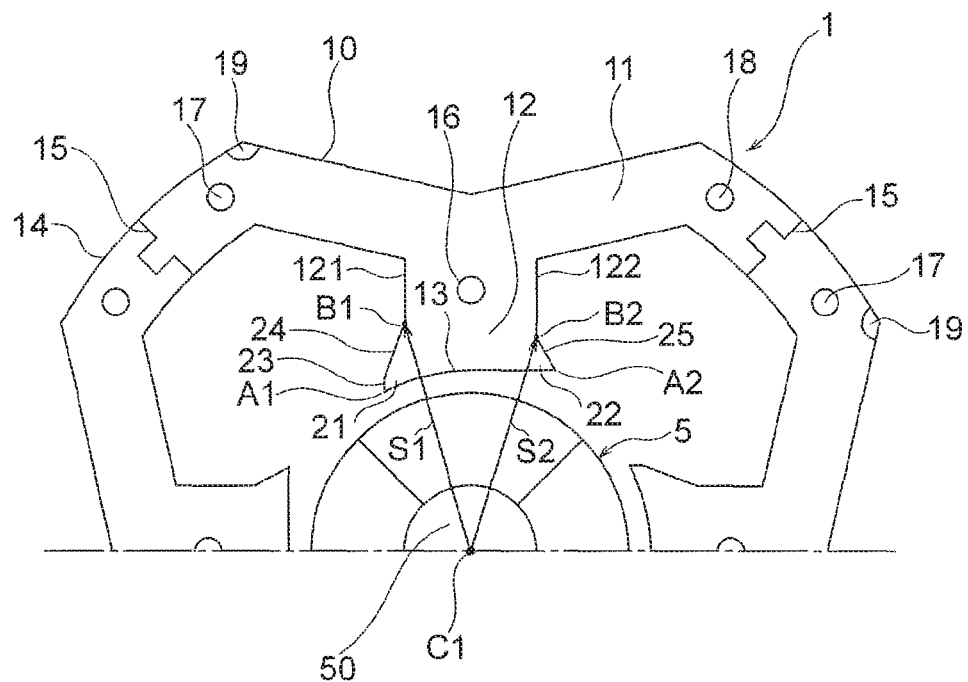
FIG. 5 is a plan view showing a part of the motor of the first embodiment.

FIG. 5 is a diagram for further explaining the positions of the borders B1 and B2 of the tooth 12. In FIG. 5, a distance S1 is defined as a distance from the rotation axis C1 to the first border B1. A distance S2 is defined as a distance from the rotation axis C1 to the second border B2. In this example, the distance S1 from the rotation axis C1 to the first border B1 is longer than the distance S2 from the rotation axis C1 to the second border B2 (i.e., S1>S2).

Figure 6:
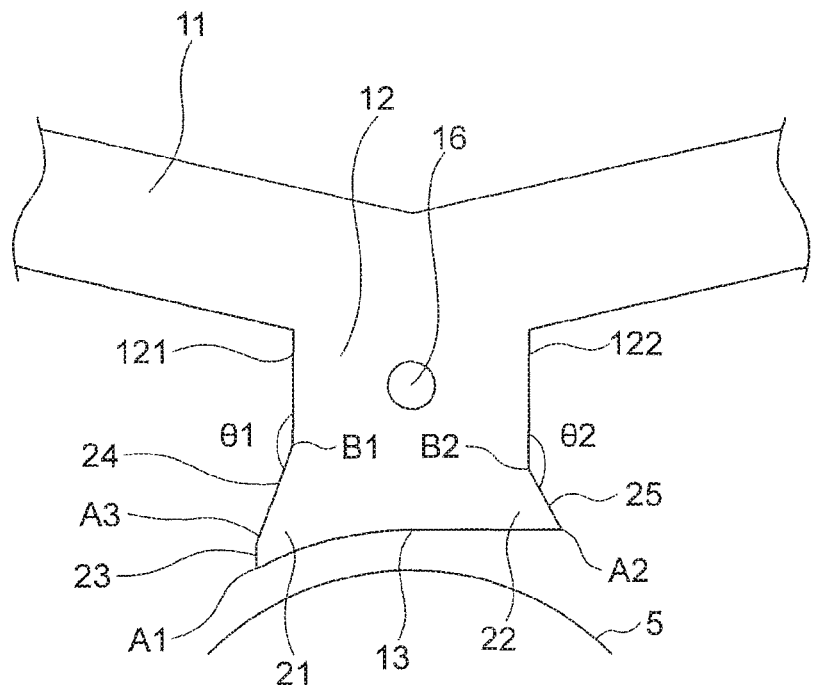
FIG. 6 is an enlarged view showing a part of the stator of the first embodiment.

FIG. 6 is an enlarged view showing a part including the tooth 12 of the stator core 10. As shown in FIG. 6, the first side portion 121 and the first inclined portion 24 of the tooth 12 form an angle θ1 at the border B1. The second side portion 122 and the second inclined portion 25 of the tooth 12 form an angle θ2 at the border B2. Both of the angles θ1 and θ2 are larger than 90 degrees.

The angle θ1 formed between the first inclined portion 24 and the first side portion 121 is larger (i.e., closer to 180 degrees) than the angle θ2 formed between the second inclined portion 25 and the second side portion 122. That is, the first inclined portion 24 and the first side portion 121 are configured so that a change in the direction of the magnetic flux is relatively small when the magnetic flux flows from the first inclined portion 24 to the first side portion 121, as described later.

(Function)

Figure 7:
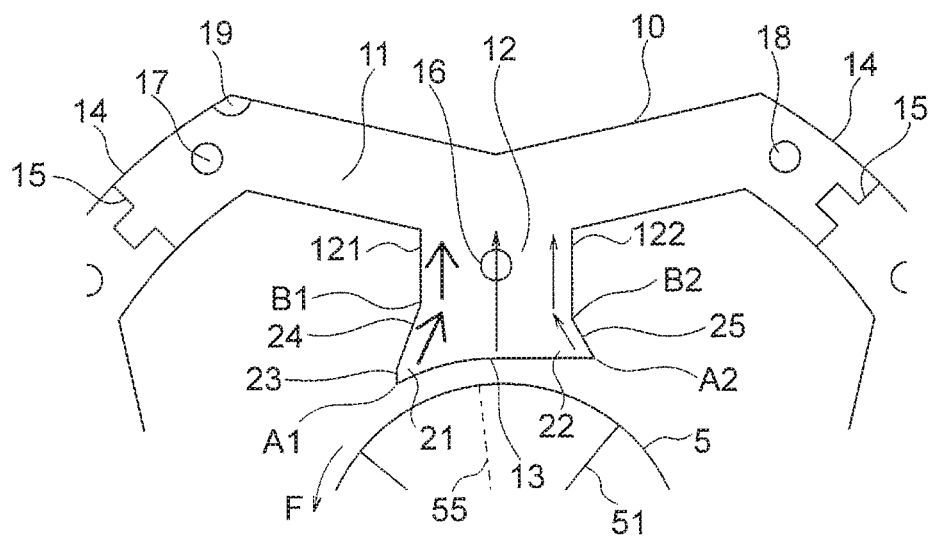
FIG. 7 is a schematic diagram showing flows of magnetic flux in the stator of the first embodiment.

Next, function of the motor 100 of the first embodiment will be described. FIG. 7 is a diagram schematically showing flows of magnetic flux in the tooth 12 of the stator 1. As described above, in the motor 100, the number of magnetic poles of the rotor 5 is the same as the number of teeth 12 of the stator 1. Thus, when no current flows through the coil in the stator 1 (in other words, when the rotation stops), each of the magnetic poles of the rotor 5 (i.e., the permanent magnet 51 or 52) faces a corresponding one of the plurality of teeth 12 in the stator 1 due to a magnetic attraction force.

FIG. 7 indicates the magnetic flux flowing from the rotor 5 into the first end A1 side of the tooth tip 13, the magnetic flux flowing into the center of the tooth tip 13, and the magnetic flux flowing into the second end A2 side of the tooth tip 13, using arrows having widths in accordance with their magnetic flux amounts.

In the first embodiment, the gap between the tooth tip 13 and the rotor 5 is narrower on the first end A1 side and wider on the second end A2 side. Since a large part of the magnetic flux from the rotor 5 flows into the portion of the tooth 12 where the gap from the rotor 5 is narrow, the amount of the magnetic flux flowing into the first end A1 side of the tooth tip 13 is the largest, the amount of the magnetic flux flowing into the center of the tooth tip 13 is the second largest, and the amount of the magnetic flux flowing into the second end A2 side of the tooth tip 13 is the smallest.

The magnetic flux flowing into the first end A1 side of the tooth tip 13 flows along the end edge portion 23 and the first inclined portion 24, and further flows outward in the radial direction along the first side portion 121. The magnetic flux flowing into the center of the tooth tip 13 flows through the center of the tooth 12 in the circumferential direction, and flows outward in the radial direction. The magnetic flux flowing into the second end A2 side of the tooth tip 13 flows along the second inclined portion 25, and further flows outward in the radial direction along the second side portion 122.

Since the magnetic flux flows the most in the first end A1 side of the tooth 12, the rotor 5 is more strongly attracted toward the first end A1 side of the tooth 12 (i.e., toward the first protruding portion 21 side). As a result, the rotor 5 stops in a state where a center 55 of the magnetic pole in the circumferential direction rotates to the first end A1 side relative to the center of the tooth 12 in the circumferential direction.

When a current flows through the coils of the stator 1 in this state, the rotor 5 rotates counterclockwise (in the direction indicated by an arrow F) due to a repulsive force between magnetic field generated by the current and the magnetic poles of the rotor 5 (the permanent magnet 51 in FIG. 7). That is, the rotating direction of the motor 100 at the start of rotation is fixed in one direction.

However, when the gap between the tooth tip 13 and the outer circumferential surface of the rotor 5 is made different at the end A1 and at the end A2, the magnetic flux from the rotor 5 may be concentrated on the first protruding portion 21. This may cause magnetic saturation, and may result in an increase in the iron loss.

For this reason, as shown in FIG. 4, the distance D1 from the reference line L1 to the border B1 is made longer than the distance D2 from the reference line L1 to the second border B2. With this configuration, in a plane perpendicular to the rotation axis C1, the area of the first protruding portion 21 is larger than the area of the second protruding portion 22. In other words, a width (more specifically, width in the radial direction) of a magnetic path through which the magnetic flux flowing into the first protruding portion 21 from the rotor 5 passes increases.

Consequently, an increase in the magnetic flux density at the first protruding portion 21 can be suppressed even when a large part of the magnetic flux from the rotor 5 flows into the first protruding portion 21 through the first end A1 side of the tooth tip 13. That is, occurrence of magnetic saturation can be suppressed, and thus the iron loss can be reduced.

As shown in FIG. 6, the angle θ1 formed between the first inclined portion 24 and the first side portion 121 is larger than the angle θ2 formed between the second inclined portion 25 and the second side portion 122. Thus, when the magnetic flux passing the first inclined portion 24 changes its direction at the border B1 and flows along the first side portion 121, a change in the direction (vector) of the magnetic flux is reduced.

If there is a portion of the magnetic path where the direction (vector) of the magnetic flux changes, concentration of the magnetic flux may occur locally, and magnetic saturation may occur locally. In particular, the area along the first inclined portion 24 and the first side portion 121 of the tooth 12 is a region where a large part of the magnetic flux flows. Thus, when the angle θ1 is made larger so as to reduce a change in the direction of the magnetic flux in the vicinity of the border B1 as described above, local occurrence of the magnetic saturation can be suppressed, and the iron loss can be reduced.

Figure 8:
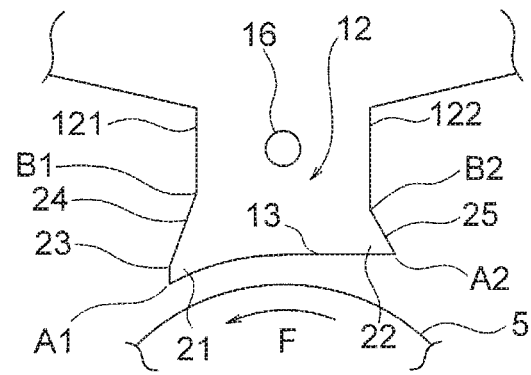
FIG. 8 is an enlarged view showing a tooth of the stator of the first embodiment.
Figure 9:
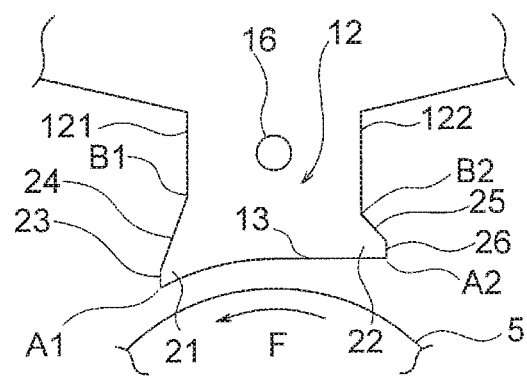
FIG. 9 is an enlarged view showing a tooth of a stator of another configuration example.

Next, function obtained by a shape of the tip of the tooth 12 will be described. FIG. 8 is a diagram showing the shape of the tooth 12. FIG. 9 is a diagram showing the shape of the tooth 12 in another configuration example.

As shown in FIG. 8, in the first embodiment, the first protruding portion 21 has three end edges, namely, the first inclined portion 24, the end edge portion 23, and the tooth tip 13 (particularly, a portion on the first end A1 side). Meanwhile, the second protruding portion 22 has two end edges, namely, the second inclined portion 25 and the tooth tip 13 (particularly, a portion on the second end A2 side).

The first protruding portion 21 including the three end edges has a large dimension in the radial direction, and thus the width of the magnetic path is wide. Meanwhile, the second protruding portion 22 including the two edges has a small dimension in the radial direction, and thus the width of the magnetic path is narrow.

As described above, the magnetic flux flowing through the second protruding portion 22 is small as compared with the magnetic flux flowing through the first protruding portion 21 in the tooth 12. Thus, an increase in the magnetic flux density is less likely to occur even when the width of the magnetic path in the second protruding portion 22 is made narrower. Rather, by reducing a dimension of the second protruding portion 22 in the radial direction, the area of the second protruding portion 22 in a plane perpendicular to the rotation axis C1 decreases, and the weight of the stator 1 can be reduced.

In the configuration example shown in FIG. 9, the shape of the first protruding portion 21 is similar to that of the first protruding portion 21 shown in FIG. 8, but the second protruding portion 22 has three end edges, namely, the second inclined portion 25, an end edge portion 26, and the tooth tip 13 (particularly, a portion on the second end A2 side). The end edge portion 26 extends outward in the radial direction from the second end A2 in parallel with the second side portion 122.

In this configuration example, the second protruding portion 22 has the three end edges similarly to the first protruding portion 21. Thus, the dimension of the second protruding portion 22 in the radial direction increases, and the width of the magnetic path thus increases. However, because the amount of magnetic flux flowing through the second protruding portion 22 is small, an enhancing effect (such as suppression of magnetic saturation) due to an increase in the width of the magnetic path is small. Further, an increase in the dimension of the second protruding portion 22 in the radial direction results in an increase in the area of the second protruding portion 22 in a plane perpendicular to the rotation axis C1, and thus the weight of the stator 1 increases.

Figure 10:
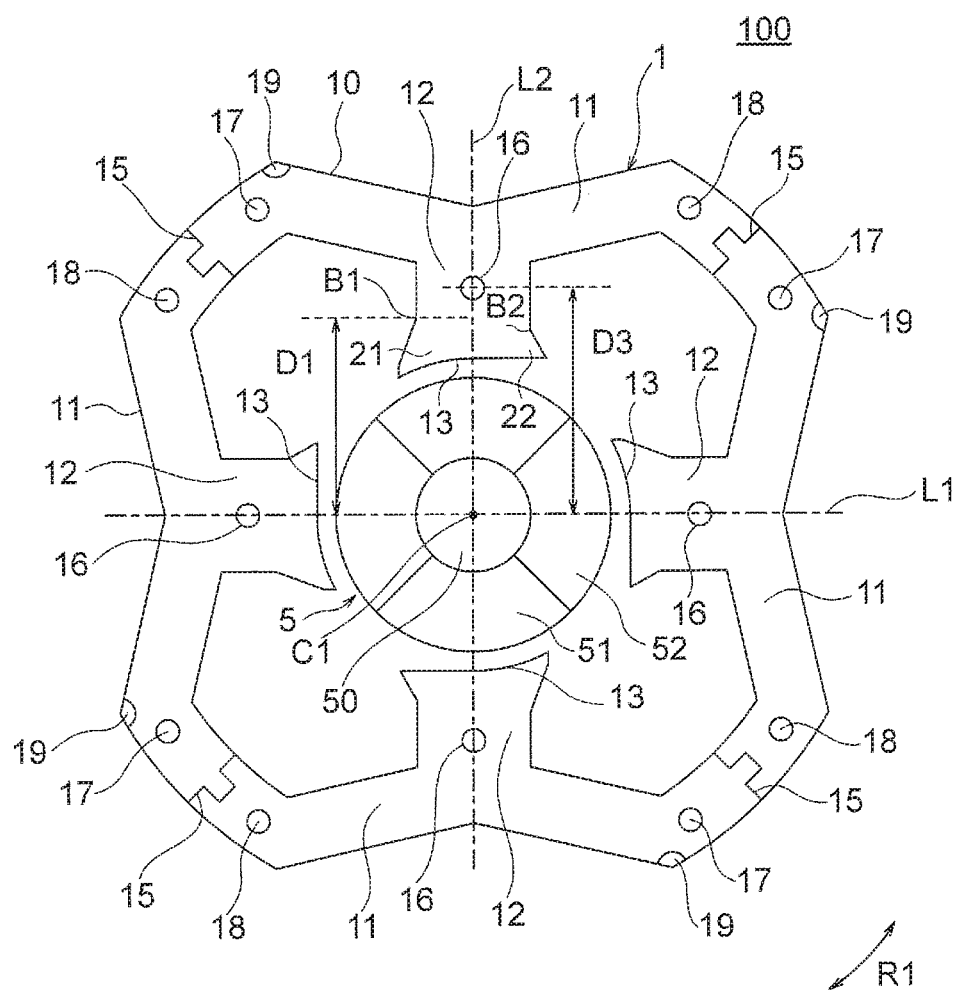
FIG. 10 is a plan view showing the motor of the first embodiment.

Next, a positional relationship between the borders (bent points) B1 and B2 of the tooth 12 and the crimping portion 16 will be described. FIG. 10 is a plan view of the motor 100 for explaining the positional relationship between the borders B1 and B2 of the tooth 12 and the crimping portion 16. Among the crimping portions 16, 17, and 18 for integrally fixing the stator core 10, the crimping portions 17 and 18 are formed in the yoke 11, while the crimping portions 16 are formed in the teeth 12.

The reference line L1 is a straight line passing through the rotation axis C1 and perpendicular to the straight line L2 (i.e., the straight line in the radial direction passing through the center of the tooth 12 in the circumferential direction), as described above. A distance D3 from the reference line L1 to the crimping portion 16 is longer than the distance D1 from the reference line L1 to the border B1.

The magnetic flux flowing along the first inclined portion 24 changes its direction in the vicinity of the border B1 and flows along the first side portion 121, and thus the magnetic flux density is more likely to locally increase in the vicinity of the boarder B1. Meanwhile, the crimping portion 16 is formed by deforming the stacking elements (for example, electromagnetic steel sheets), and thus the magnetic flux is less likely to flow through the crimping portion 16. That is, as the amount of magnetic flux passing through the crimping portion 16 increases, the iron loss increases.

Thus, in the first embodiment, the distance D3 from the reference line L1 to the crimping portion 16 is made longer than the distance D1 from the reference line L1 to the border B1, and thus the crimping portion 16 is distanced from the vicinity of the border B1 of the tooth 12 (i.e., an area where the magnetic flux density locally increases). Consequently, the influence of the crimping portion 16 on the magnetic flux can be suppressed, and the iron loss can be reduced.

Effects of First Embodiment

As described above, the motor 100 of the first embodiment is of an inner rotor type, and the number of the magnetic poles of the rotor 5 is the same as the number of the teeth 12 of the stator 1. Each teeth 12 has, on the tooth tip 13 side, the first protruding portion 21 protruding in the first direction from the first side portion 121 and the second protruding portion 22 protruding in the second direction from the second side portion 122. The gap G2 between the second end A2 (the end in the second direction) of the tooth tip 13 and the rotor 5 is wider than the gap G1 between the first end A1 (the end in the first direction) of the tooth tip 13 and the rotor 5. Thus, a large part of the magnetic flux from the rotor 5 flows into the first end A1 side of the tooth 12. Therefore, when the motor 100 stops rotating, the rotor 5 stops in a state where the magnetic poles are strongly attracted toward the first end A1 sides of the teeth 12. When the current flows through the coils of the stator 1, the rotor 5 rotates in the first direction by the magnetic repulsion force. Accordingly, the rotating direction of the motor 100 at the start of rotation is fixed in one direction.

When the reference line L1 is defined as a straight line passing through the rotation axis C1 and perpendicular to the straight line L2 in the radial direction passing through the center of the tooth 12 in the circumferential direction (the middle position between the side portions 121 and 122), the distance D1 from the reference line L1 to the border B1 between the first protruding portion 21 and the first side portion 121 is longer than the distance D2 from the reference line L1 to the border B2 between the second protruding portion 22 and the second side portion 122. Thus, in the plane perpendicular to the rotation axis C1, the area of the first protruding portion 21 is larger than the area of the second protruding portion 22. Therefore, an increase in the magnetic flux density at the first protruding portion 21 can be suppressed even when a large part of the magnetic flux from the rotor 5 flows into the first protruding portion 21. Consequently, the magnetic saturation can be suppressed, and the iron loss can be reduced. Thus, the motor efficiency can be enhanced.

In the first embodiment, the angle θ1 formed between the first inclined portion 24 and the first side portion 121 is larger than the angle θ2 formed between the second inclined portion 25 and the second side portion 122. Thus, when the magnetic flux flows from the first inclined portion 24, passes the border B1 and flows along the first side portion 121, the change in the direction of the magnetic flux can be reduced. Thus, the local occurrence of magnetic saturation can be suppressed, and the iron loss can be reduced.

In the first embodiment, the second inclined portion 25 and the tooth tip 13 are connected to each other at the second end A2 in the second protruding portion 22, and thus the dimension of the second protruding portion 22 in the radial direction decreases. Thus, in a plane perpendicular to the rotation axis C1, the area of the second protruding portion 22 can be reduced. Therefore, the weight of the stator 1 can be reduced.

Further, in the first embodiment, the first protruding portion 21 has the end edge portion 23 provided between the first inclined portion 24 and the tooth tip 13, and thus the dimension of the first protruding portion 21 in the radial direction increases. Therefore, the width of the magnetic path through which the magnetic flux from the rotor 5 flows increases, and an increase in the magnetic flux density can be effectively suppressed.

In the first embodiment, the distance D3 from the above-described reference line L1 to the crimping portion 16 is longer than the distance D1 from the reference line L1 to the border B1, and thus the crimping portion 16 can be distanced from the vicinity of the border B1 (i.e., the area where the magnetic flux density locally increases) of the tooth 12. Thus, the iron loss can be reduced.

In the first embodiment, the yoke 11 of the stator 1 includes the back yoke 111 and the connecting portion 112 which are adjacent to each other in the circumferential direction. The connecting portion 112 is located on the inner side of the back yoke 111 in the radial direction, and the tooth 12 is formed in the connecting portion 112. Thus, even when the back yoke 111 is engaged with the frame 4, the magnetic flux flowing through the tooth 12 is less likely to be influenced by a pressure due to the engagement.

In the first embodiment, the yoke 11 of the stator core 10 has the split surfaces 15, and thus the stator core 10 can be configured by combining a plurality of split cores 2. Thus, a step of winding the coils around the teeth 12 can be simplified, and thereby a step of assembling the motor 100 can be simplified.

Second Embodiment

Figure 11:
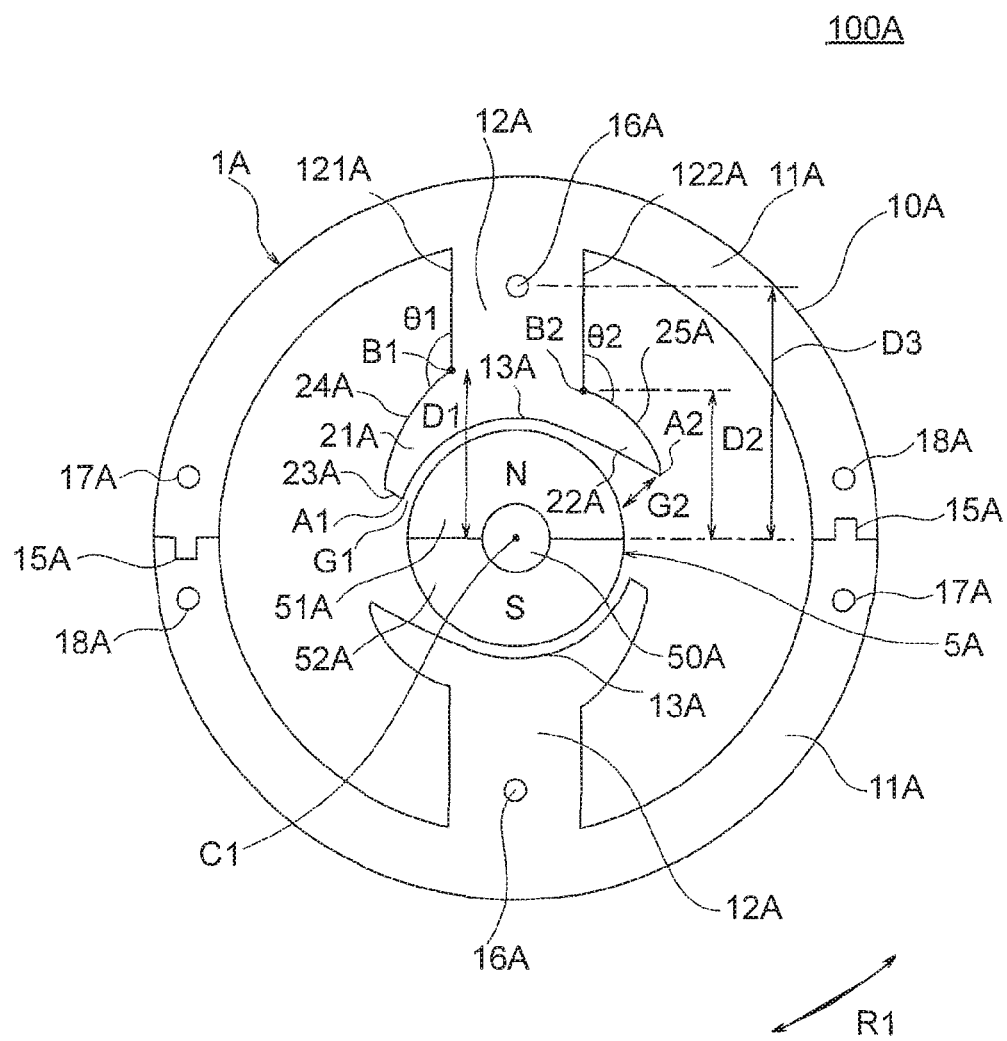
FIG. 11 is a plan view showing a motor of a second embodiment.

Next, a second embodiment of the present invention will be described. As shown in FIG. 11, a motor 100A of the second embodiment includes a rotor 5A having a shaft 50A, and a stator 1A surrounding the rotor 5A. The stator 1A is fixed to the inner circumferential side of the frame 4 shown in FIG. 1. In the second embodiment, the number of magnetic poles of the rotor 5A is two, and the yoke 11A of the stator 1A is annular.

The rotor 5A includes the shaft 50A and permanent magnets 51A and 52A fixed around the shaft 50A. The rotor 5A has two poles, namely, one permanent magnet 51A and one permanent magnet 52A.

The stator 1A includes a stator core 10A, insulating portions 3 (FIG. 1), and coils. The stator core 10A is formed by stacking a plurality of stacking elements (for example, electromagnetic steel sheets or the like) in the axial direction and integrally fixing them with crimping portions 16A, 17A, and 18A.

The stator core 10A has an annular yoke 11A surrounding the rotor 5A and a plurality of teeth 12A extending from the yoke 11A toward the rotor 5A. The number of teeth 12A is the same as the number of magnetic poles of the rotor 5A, which is two in this example. Among the crimping portions 16A, 17A, and 18A, the crimping portions 16A are formed in the teeth 12A, while the crimping portions 17A and 18A are formed in the yoke 11A.

Each tooth 12A has a first side portion 121A which is an end edge in a first direction and a second side portion 122A which is an end edge in a second direction. Each of the first side portion 121A and the second side portion 122A extends in parallel with the straight line L2 in the radial direction passing through the center of the tooth 12A in the circumferential direction (the middle position between the side portions 121A and 122A).

The tooth 12A also has a tooth tip 13A facing the rotor 5A. A first end A1 is defined as an end of the tooth tip 13A in the first direction. A second end A2 is defined as an end of the tooth tip 13A in the second direction.

The tooth 12A has a first protruding portion 21A and a second protruding portion 22A, on the tooth tip 13A side. The first protruding portion 21A protrudes in the first direction from the first side portion 121A, and the second protruding portion 22A protrudes in the second direction from the second side portion 122A.

The first protruding portion 21A has a first inclined portion 24A which is curved and inclined relative to the first side portion 121A, and an end edge portion 23A extending from a terminal end of the first inclined portion 24A to the first end A1. The second protruding portion 22A has a second inclined portion 25A which is curved and inclined relative to the second side portion 122A. The second inclined portion 25A and the tooth tip 13A are connected to each other at the second end A2. A first border B1 is defined as a border between the first side portion 121A and the first inclined portion 24A of the tooth 12A. A second border B2 is defined as a border between the second side portion 122A and the second inclined portion 25A of the tooth 12A.

In the second embodiment, a gap G2 between the second end A2 and an outer circumferential surface of the rotor 5A is wider than a gap G1 between the first end A1 of the tooth tip 13A and the outer circumferential surface of the rotor 5A (i.e., G1<G2). Specifically, the tooth tip 13A is curved in an arc shape along the outer circumferential surface of the rotor 5A on the first end A1 side with respect to its center in the circumferential direction, and extends linearly on the second end A2 side with respect to its center in the circumferential direction.

In this way, since the gap between the tooth tip 13A and the rotor 5A is narrower on the first end A1 side and wider on the second end A2 side, a large part of the magnetic flux from the rotor 5A flows into the first end A1 side (i.e., the first protruding portion 21A side) of the tooth 12A.

The distance D1 from the reference line L1 to the first border B1 is longer than the distance D2 from the reference line L1 to the second border B2 (i.e., D1>D2). Thus, in a plane perpendicular to the rotation axis C1, an area of the first protruding portion 21A is larger than an area of the second protruding portion 22A. Therefore, an increase in the magnetic flux density in the first protruding portion 21A can be suppressed even when a large part of the magnetic flux from the rotor 5A flows into the first protruding portion 21A of the tooth 12A.

An angle θ1 formed between the first inclined portion 24A and the first side portion 121A is larger than an angle θ2 formed between the second inclined portion 25A and the second side portion 122A. Thus, when the magnetic flux flowing along the first inclined portion 24A and then flows along the first side portion 121A, a change in the direction of the magnetic flux can be reduced, and thus the iron loss can be reduced.

The distance D3 from the reference line L1 to the crimping portion 16A is longer than the distance D1 from the reference line L1 to the border B1. Thus, the crimping portion 16A can be distanced from the vicinity of the border B1 (i.e., an area where the magnetic flux density locally increases) of the tooth 12A. Consequently, the influence of the crimping portion 16A on the magnetic flux is suppressed, and thus the iron loss can be reduced.

Effects of Second Embodiment

As described above, in the motor 100A of the second embodiment, the tooth 12A has, on the tooth tip 13A side, the first protruding portion 21A protruding in the first direction from the first side portion 121A and the second protruding portion 22A protruding in the second direction from the second side portion 122A. The gap G2 between the second end A2 of the tooth tip 13A and the rotor 5A is wider than the gap G1 between the first end A1 of the tooth tip 13A and the rotor 5A. Thus, a large part of the magnetic flux from the rotor 5A flows into the first end A1 side of the tooth 12A. Therefore, as in the first embodiment, when the current flows through the coils of the stator 1A, the rotor 5A rotates in the first direction by the magnetic repulsion force, and thus the rotating direction of the motor 100A at the start of rotation is fixed in one direction.

Further, the distance D1 from the reference line L1 to the border B1 between the first protruding portion 21A and the first side portion 121A is longer than the distance D2 from the reference line L1 to the border B2 between the second protruding portion 22A and the second side portion 122A. Thus, in a plane perpendicular to the rotation axis C1, the area of the first protruding portion 21A is larger than the area of the second protruding portion 22A. Therefore, an increase in the magnetic flux density at the first protruding portion 21A can be suppressed even when a large part of the magnetic flux flows from the rotor 5A into the first protruding portion 21A. Consequently, the magnetic saturation can be suppressed, and the iron loss can be reduced. Thus, the motor efficiency can be enhanced.

COMPARATIVE EXAMPLE

Figure 12:
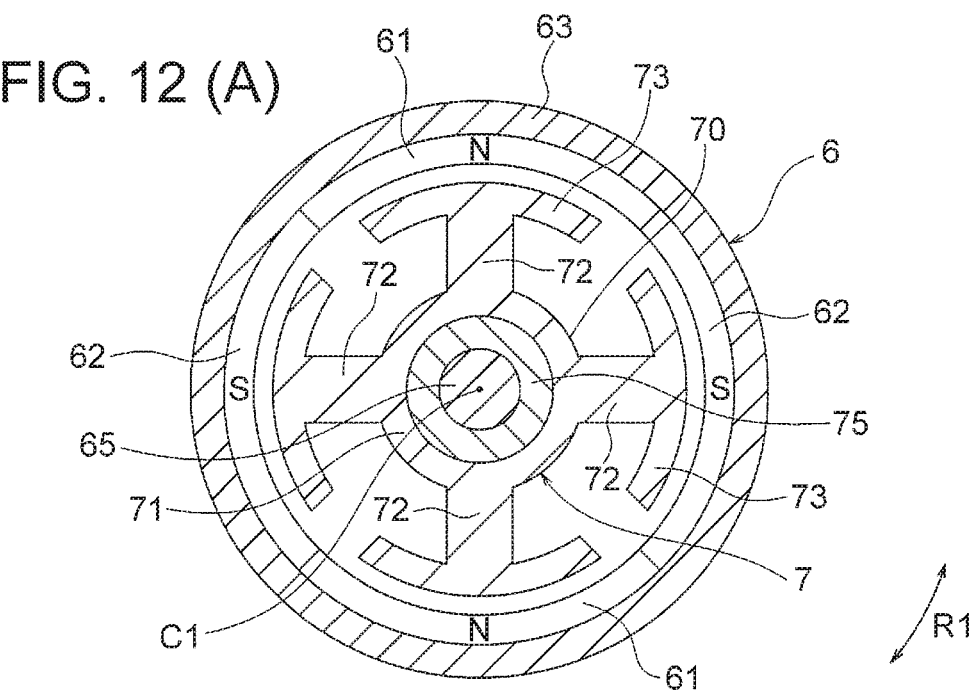
FIG. 12(A) is a cross-sectional view showing a motor of a comparative example.
FIG. 12(B) is a longitudinal-sectional view of the motor.
Figure 12:
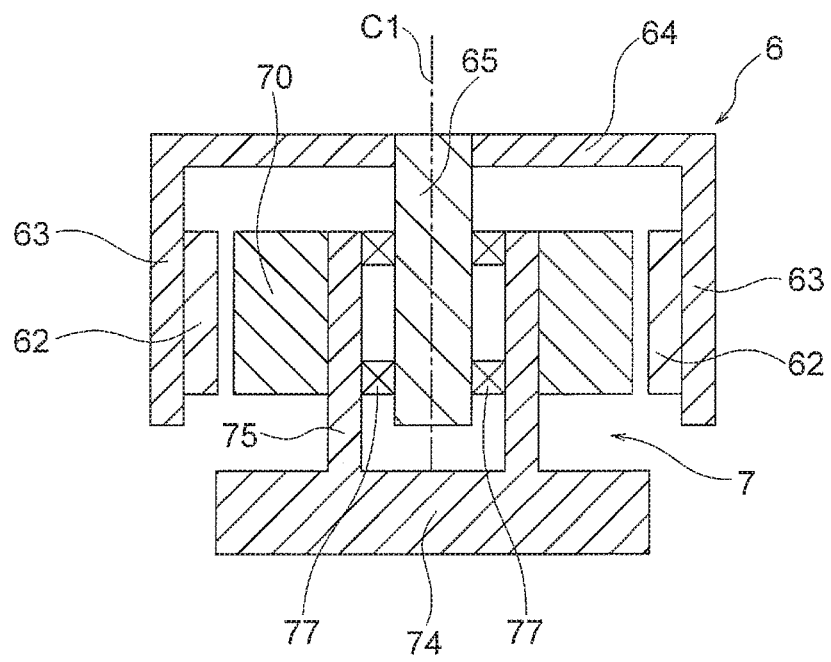

Next, a motor of a comparative example in comparison with the first and second embodiments will be described. FIGS. 12(A) and 12(B) are a cross-sectional view and a longitudinal-sectional view showing the motor of the comparative example, respectively. The motor 100 (100A) of the above-described first or second embodiment is of an inner rotor type, while the motor of the comparative example is of an outer rotor type.

That is, as shown in FIGS. 12(A) and 12(B), a rotor 6 is provided to surround a stator 7 from an outer side in the radial direction. The rotor 6 includes a disk portion 64 fixed to one end of a shaft 65, a cylindrical portion 63 provided on an outer circumference of the disk portion 64, and permanent magnets 61 and 62 fixed to an inner circumferential surface of the cylindrical portion 63.

The stator 7 includes a stator core 70. The stator core 70 has a cylindrical yoke 71 and a plurality of teeth 72 extending outward in the radial direction from the yoke 71. Each tooth 72 has a tooth tip 73 facing the permanent magnet 61 or 62 via an air gap. A coil is wound around the tooth 72 via an insulating portion. In FIGS. 12(A) and 12(B), the insulating portion and the coil are omitted.

The stator core 70 is supported by a base 74 as a supporting body. The base 74 has a cylindrical portion 75, and the stator core 70 is fixed to an outer circumferential surface of the cylindrical portion 75. The shaft 65 is supported on an inner circumferential side of the cylindrical portion 75 via bearings 77 (FIG. 12(B)).

In the motor of the comparative example, the rotor 6 is supported by the shaft 65 via the disk portion 64, and thus it is difficult to align a rotation axis of the shaft 65 with a rotation axis of the rotor 6 with high accuracy. Further, a weight of the rotor 6 concentrates on the outer circumferential side of the rotor 6, and an outer diameter of the rotor 6 is larger than that of the inner rotor type motor. Thus, a centrifugal force tends to increase, and high speed rotation of the rotor 6 is difficult.

In contrast, in the motor 100 of the first embodiment, as shown in FIG. 1, the rotor 5 is directly fixed to the shaft 50, and thus the rotation axis of the rotor 5 can be aligned with the rotation axis of the shaft 50 with high accuracy. In addition, an outer diameter of the rotor 5 can be made smaller, and thus the centrifugal force can be suppressed and stable high-speed rotation can be achieved.

(Fan)

Figure 13:
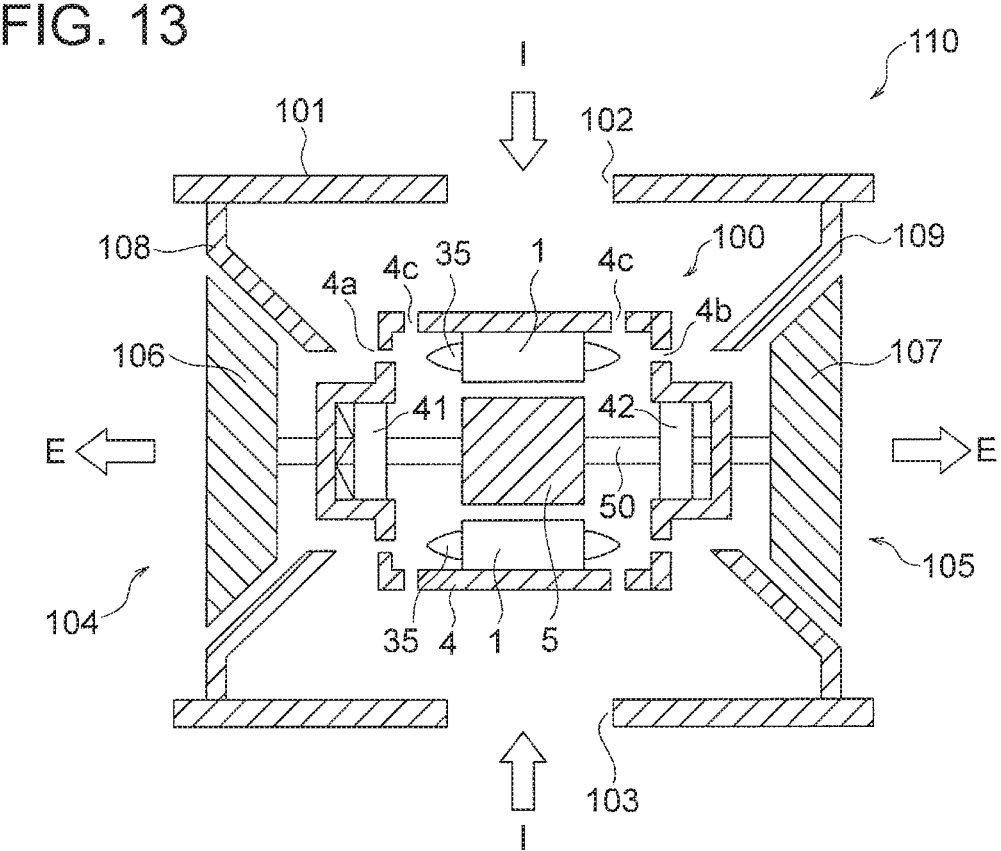
FIG. 13 is a diagram showing a configuration example of a fan to which the motor of each embodiment is applied.

Next, a configuration example of a fan to which the motor 100 or 100A of the first or second embodiment is applied will be described. FIG. 13 is a schematic diagram showing the fan 110 that includes the motor 100 of the first embodiment. The fan 110 includes the motor 100 of the first embodiment, impellers 106 and 107 driven by the motor 100, and a housing 101.

The frame 4 covers the stator 1 and the rotor 5 of the motor 100 and is fixed to the housing 101. The shaft 50 of the rotor 5 is rotatably supported on the frame 4 by bearings 41 and 42. The shaft 50 passes through the frame 4 in the axial direction, and the impellers 106 and 107 are attached to both ends of the shaft 50. The impellers 106 and 107 are, for example, centrifugal blades or turbo blades.

The frame 4 has holes 4a, 4b, and 4c to allow air to flow through the frame 4. The holes 4a and 4b pass through the frame 4 in the axial direction, while the hole 4c passes through the frame 4 in the radial direction.

The housing 101 covers the motor 100 and the impellers 106 and 107. The housing 101 has suction ports 102 and 103 for sucking air into the housing 101, discharge ports 104 and 105 for discharging air from the housing 101, and fan covers 108 and 109 for covering the impellers 106 and 107, respectively.

When the rotor 5 rotates by applying a current to the coils 35 of the stator 1, the impellers 106 and 107 rotate together with the shaft 50. The impellers 106 and 107 generate airflow. Air flows through the suction ports 102 and 103 into the housing 101 as indicated by arrows I, and is discharged through the discharge ports 104 and 105 as indicated by arrows E. Part of the air flowing into the housing 101 passes through the frame 4 via the holes 4a, 4b, and 4c, and thus the motor 100 is cooled.

The fan 110 uses the motor 100 whose motor efficiency is enhanced by reducing the iron loss, and thus the fan 110 can achieve a high operation efficiency. The motor 100A of the second embodiment may be used instead of the motor 100 of the first embodiment.

(Vacuum Cleaner)

Figure 14:
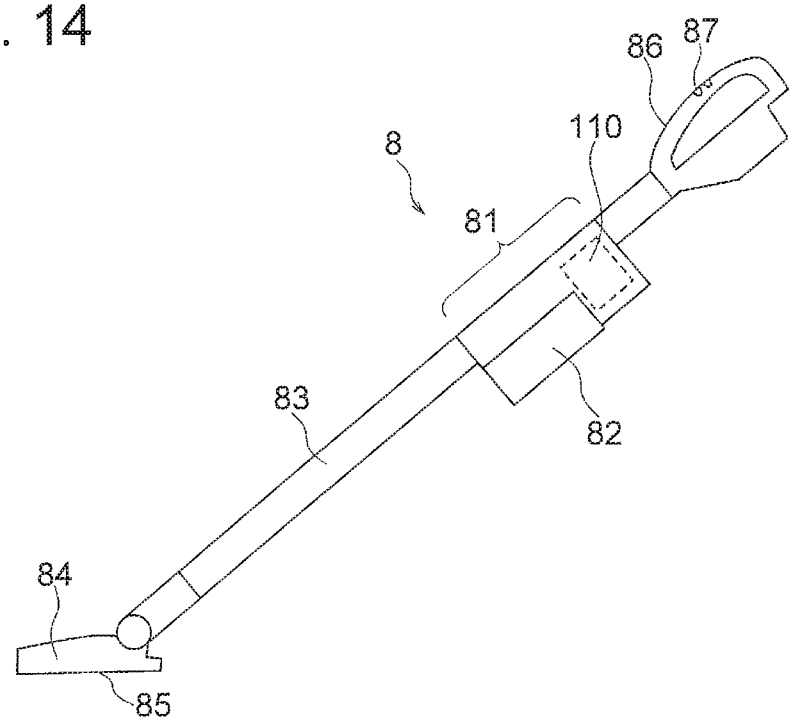
FIG. 14 is a diagram showing an electric vacuum cleaner including a fan to which the motor of each embodiment is applied.

Next, an electric vacuum cleaner using the fan 110 to which the motor 100 or 100A of the above-described embodiment 1 or 2 is applied will be described. FIG. 14 is a schematic diagram showing an electric vacuum cleaner 8 using the fan 110 (FIG. 13) that includes the motor 100 of the first embodiment.

The electric vacuum cleaner 8 includes a vacuum cleaner main body 81, a pipe 83 connected to the vacuum cleaner main body 81, and a suction portion 84 connected to a tip of the pipe 83. The suction portion 84 is provided with a suction opening 85 for sucking air containing dust. A dust collection container 82 is disposed inside the vacuum cleaner main body 81.

The fan 110 is disposed inside the vacuum cleaner main body 81 to suck the air containing dust from the suction opening 85 into the dust collection container 82. The fan 110 has a configuration, for example, shown in FIG. 13. The vacuum cleaner main body 81 is also provided with a grip portion 86 that is gripped by a user, and the grip portion 86 is provided with an operation portion 87 such as an on/off switch.

When the user grips the grip portion 86 and operates the operation portion 87, the fan 110 operates and the motor 100 rotates. When the fan 110 operates, suction air is generated, and dust is sucked together with the air through the suction opening 85 and the pipe 83. The sucked dust is stored in the dust collection container 82.

The electric vacuum cleaner 8 uses the fan 110 including the motor 100 whose motor efficiency is enhanced by reducing the iron loss, and the electric vacuum cleaner 8 can achieve a high operation efficiency. The motor 100A of the second embodiment may be used instead of the motor 100 of the first embodiment.

(Hand Drier)

Figure 15:
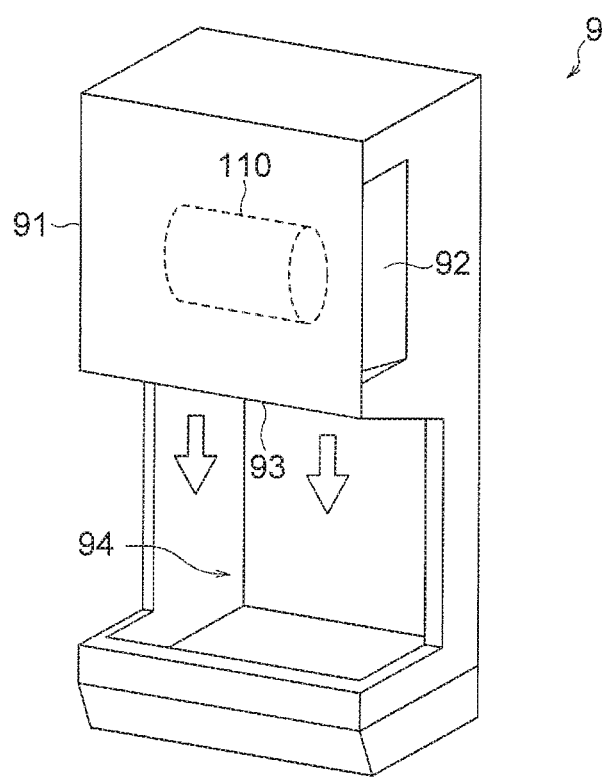
FIG. 15 is a diagram showing a hand drier including a fan to which the motor of each embodiment is applied.

Next, a hand drier using the fan 110 to which the motor 100 or 100A of the first or second embodiment is applied will be described. FIG. 15 is a schematic diagram showing a hand drier 9 using the fan 110 (FIG. 13) that includes the motor 100 of the first embodiment.

The hand drier 9 includes a housing 91 and the fan 110 fixed inside the housing 91. The fan 110 has a configuration, for example, shown in FIG. 13. The housing 91 has an intake opening 92 and an outlet opening 93. The housing 91 includes a hand insertion portion 94 located below the outlet opening 93. The hand insertion portion 94 is a portion into which hands of a user are inserted. The fan 110 generates airflow to suck air outside the housing 91 through the intake opening 92 and supply the air to the hand insertion portion 94 through the outlet opening 93.

When a power supply of the hand drier 9 is turned on, an electric power is supplied to the fan 110, and the motor 100 is driven. While the fan 110 is driven, air outside the hand drier 9 is sucked through the intake opening 92 and blown out from the outlet opening 93. When the hands of the user are inserted into the hand insertion portion 94, water droplets attached to the hands can be blown off or evaporated by the air blown from the outlet opening 93.

The hand drier 9 uses the fan 110 including the motor 100 whose motor efficiency is enhanced by reducing the iron loss, and thus the hand drier 9 can achieve a high operation efficiency. The motor 100A of the second embodiment may be used instead of the motor 100 of the first embodiment.

Although the desirable embodiments of the present invention have been specifically described, the present invention is not limited to the above-described embodiments, and various modifications and changes can be made without departing from the scope of the present invention.

What is claimed is:

1. A motor comprising:
   a rotor rotatable about a rotation axis, the rotor having a plurality of magnetic poles in a circumferential direction about the rotation axis, and
   a stator disposed on an outer side of the rotor in a radial direction about the rotation axis, the stator having a plurality of teeth in the circumferential direction,
   wherein the plurality of magnetic poles are same in number as the plurality of teeth;
   wherein each of the plurality of teeth has a first side portion which is an end edge in a first direction in the circumferential direction, a second side portion which is an end edge in a second direction opposite to the first direction, and a tooth tip facing the rotor;
   wherein each of the plurality of teeth has a first protruding portion and a second protruding portion on the tooth tip side, the first protruding portion protruding in the first direction from the first side portion, the second protruding portion protruding in the second direction from the second side portion;
   wherein each of the plurality of teeth has a crimping portion;
   wherein the tooth tip has a first end in the first direction and a second end in the second direction, and a gap G2 between the second end and the rotor is wider than a gap G1 between the first end and the rotor;
   wherein when a reference line is defined as a straight line passing through the rotation axis and perpendicular to a straight line in the radial direction passing through a middle position between the first side portion and the second side portion, a distance D1 from the reference line to a border between the first protruding portion and the first side portion is longer than a distance D2 from the reference line to a border between the second protruding portion and the second side portion; and
   wherein a distance D3 from the reference line to the crimping portion, the distance D1 from the reference line to the border between the first protruding portion and the first side portion, and the distance D2 from the reference line to the border between the second protruding portion and the second side portion satisfy D2<D1<D3.

2. The motor according to claim 1, wherein the first protruding portion has a first inclined portion inclined relative to the first side portion, and
   wherein the second protruding portion has a second inclined portion inclined relative to the second side portion.

3. The motor according to claim 2, wherein an angle θ1 between the first inclined portion and the first side portion is larger than an angle θ2 between the second inclined portion and the second side portion.

4. The motor according to claim 2, wherein the second inclined portion and the tooth tip are connected to each other at the second end.

5. The motor according to claim 2, wherein the first protruding portion has an end edge portion between the first inclined portion and the first end of the tooth tip.

6. The motor according to claim 1,
   wherein a distance from the yoke to the border between the first protruding portion and the first side portion is longer than a distance from the yoke to the border between the second protruding portion and the second side portion.

7. The motor according to claim 1, wherein the tooth tip is curved in an area on the first end side with respect to a center in the circumferential direction.

8. The motor according to claim 1, wherein the tooth tip extends straightly in an area on the second end side with respect to a center in the circumferential direction.

9. The motor according to claim 1, wherein the stator has a yoke extending so as to surround the rotor, and
   wherein the plurality of teeth extend from the yoke toward the rotor.

10. The motor according to claim 9, wherein the yoke has a back yoke extending in the circumferential direction, and a connecting portion displaced inward in the radial direction relative to the back yoke, and
    wherein the plurality of teeth extend from the connecting portion.

11. The motor according to claim 9, wherein the yoke has a split surface at which the stator is split into split cores.

12. A fan comprising:
    the motor according to claim 1, and
    an impeller driven to rotate by the motor.

13. An electric vacuum cleaner comprising a suction portion having a suction opening, a dust collection container to collect dust, and a fan to suck air containing dust from the suction portion to the dust collection container,
    the fan comprising:
    the motor according to claim 1, and
    an impeller driven to rotate by the motor.

14. A hand drier comprising:
    a housing having an intake opening and an outlet opening, and
    a fan disposed inside the housing, the fan suctioning air through the intake opening and blowing air through the outlet opening,
    the fan comprising:
    the motor according to claim 1, and
    an impeller driven to rotate by the motor.

15. The motor according to claim 1, wherein a distance from the rotation axis to the border between the first protruding portion and the first side portion is longer than a distance from the rotation axis to the border between the second protruding portion and the second side portion.

* * * * *